US010619793B2

(12) United States Patent
Ostgaard

(10) Patent No.: US 10,619,793 B2
(45) Date of Patent: Apr. 14, 2020

(54) OIL CONDITIONER FOR REMOVING FLUID IMPURITIES

(71) Applicant: John Ostgaard, Los Angeles, CA (US)

(72) Inventor: John Ostgaard, Los Angeles, CA (US)

( * ) Notice: Subject to any disclaimer, the term of this patent is extended or adjusted under 35 U.S.C. 154(b) by 0 days.

(21) Appl. No.: 16/378,408

(22) Filed: Apr. 8, 2019

(65) Prior Publication Data

US 2019/0309902 A1  Oct. 10, 2019

Related U.S. Application Data

(60) Provisional application No. 62/654,278, filed on Apr. 6, 2018.

(51) Int. Cl.
| | |
|---|---|
| *F16N 39/00* | (2006.01) |
| *B01D 27/00* | (2006.01) |
| *B01D 27/02* | (2006.01) |
| *B01D 27/08* | (2006.01) |

(52) U.S. Cl.
CPC ......... *F16N 39/005* (2013.01); *B01D 27/005* (2013.01); *B01D 27/02* (2013.01); *B01D 27/08* (2013.01)

(58) Field of Classification Search
CPC ..... F16N 39/005; B01D 27/08; B01D 27/005; B01D 27/02; B01D 35/185; F04D 29/063; F24H 1/208; F25D 21/06; F25D 21/08; B60H 1/038
See application file for complete search history.

(56) References Cited

U.S. PATENT DOCUMENTS

| | | | | |
|---|---|---|---|---|
| 6,083,406 A | * | 7/2000 | DePaul | F16N 39/06 210/742 |
| 2010/0271603 A1 | * | 10/2010 | Bandoh | H01L 21/67248 355/30 |
| 2015/0075748 A1 | * | 3/2015 | Suzuki | H01L 21/67103 165/80.5 |
| 2018/0151396 A1 | * | 5/2018 | Hanzlik | H01L 21/6719 |

OTHER PUBLICATIONS

Heat losses in aluminium holding furnaces and transfer ladles; Schwann et al., 111th Annual Metalcasting Congress, 111, 1-3; (Year: 2007).*

* cited by examiner

*Primary Examiner* — Emmanuel E Duke
(74) *Attorney, Agent, or Firm* — Robert Lauson, Esq.; Lauson & Associates

(57) ABSTRACT

An oil conditioner is provided for removing impurities from oil, such as water, fuel and glycol, to increase engine life and efficiency. An evaporator assembly includes an upper plate, a lower plate, with a heater unit sandwiched between the two. To increase the efficiency of the evaporator assembly, materials are selected so that the upper plate thermal conductivity property is greater than the lower plate thermal conductivity property; and, optionally, the lower plate includes a reflective surface to direct thermal radiation toward the upper plate. This unique design enables oil conditioning with reduced power consumption and improved heating compared to existing technology.

19 Claims, 15 Drawing Sheets

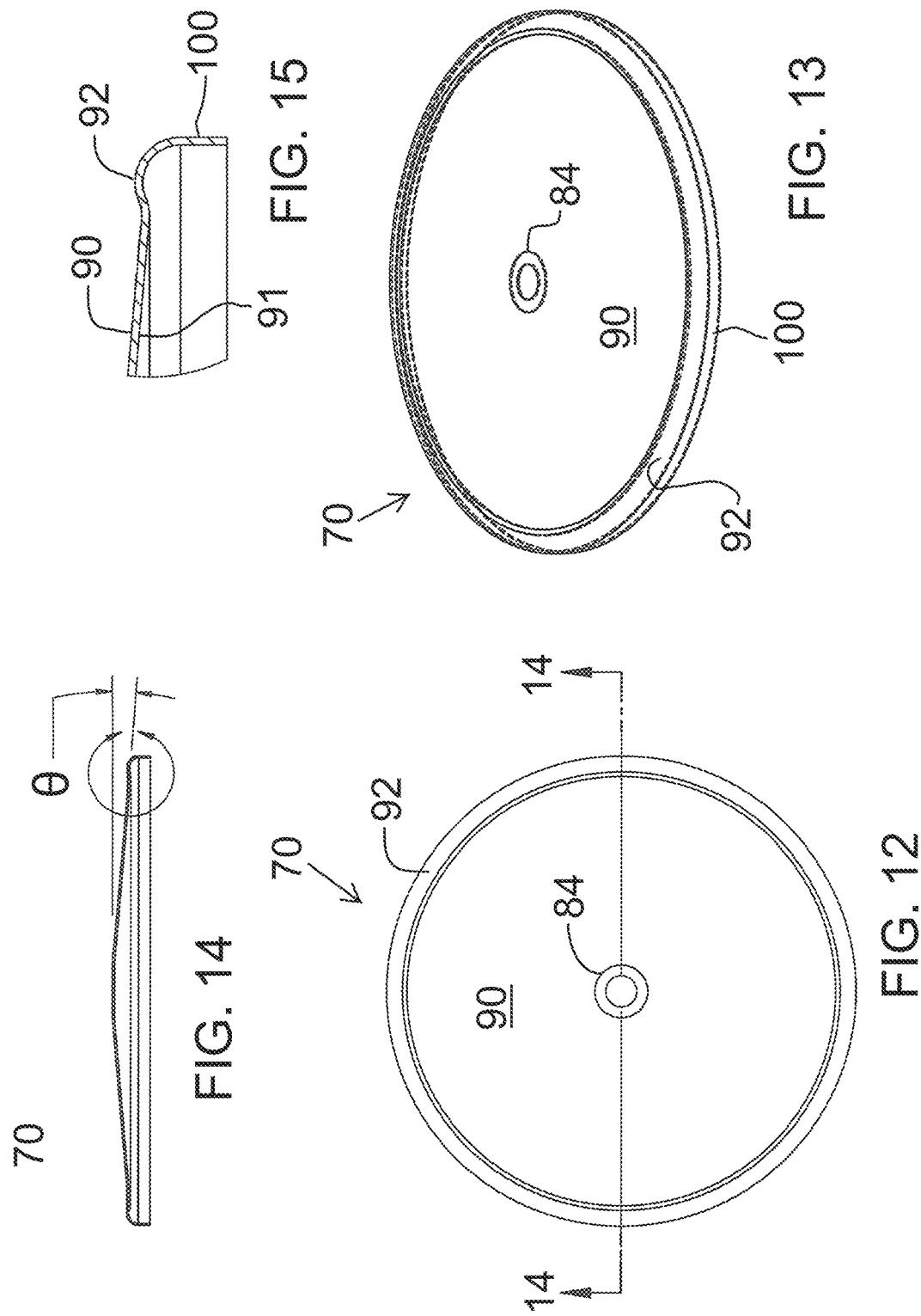

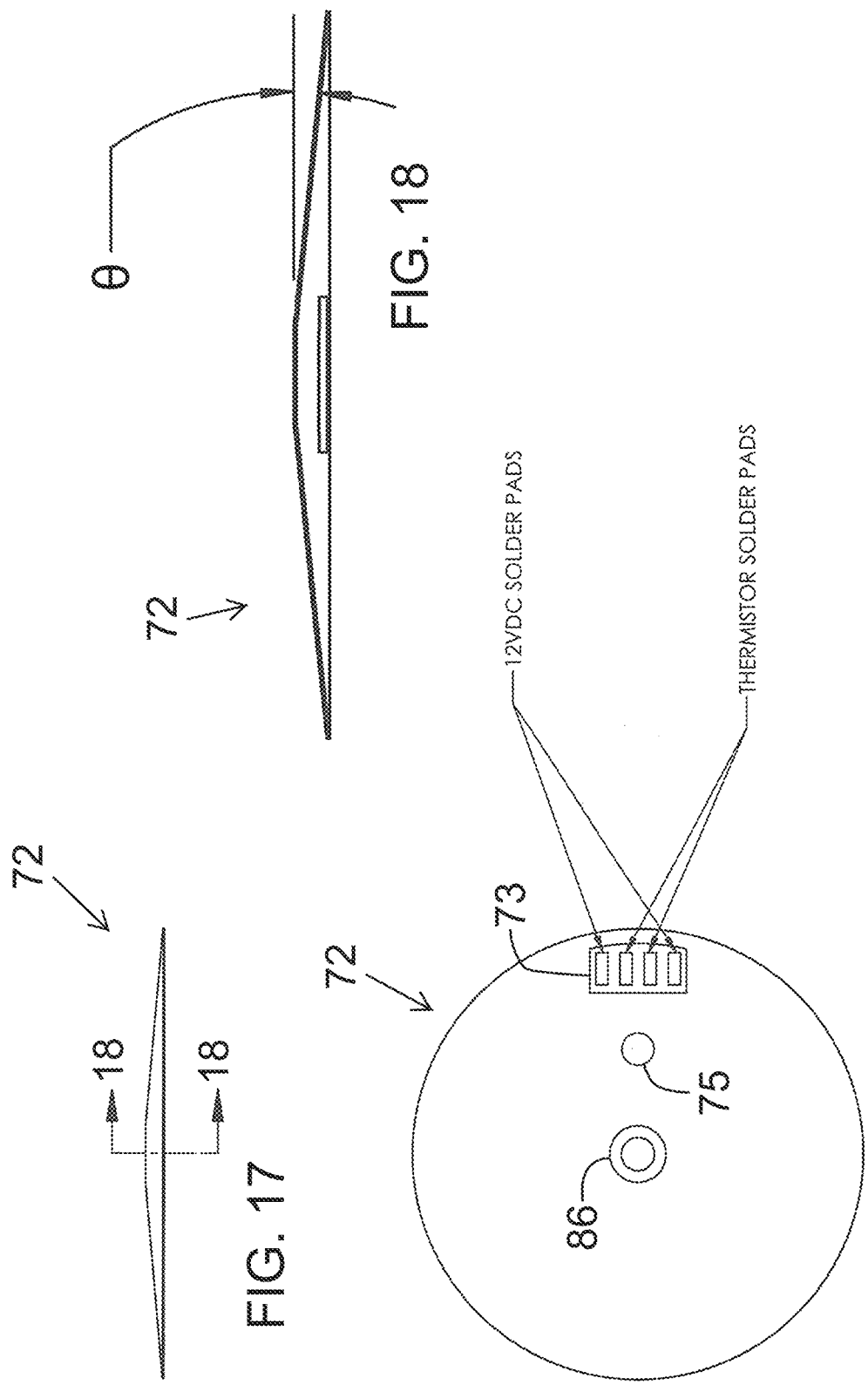

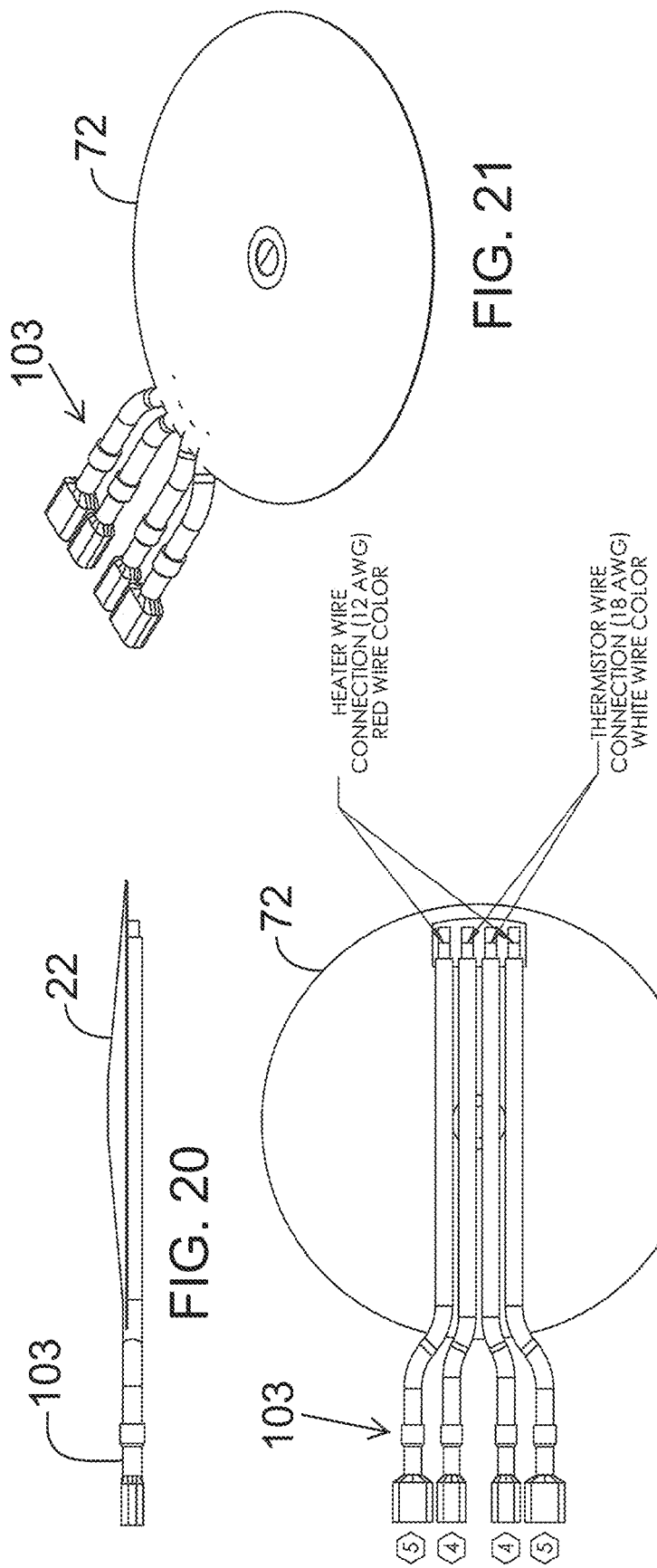

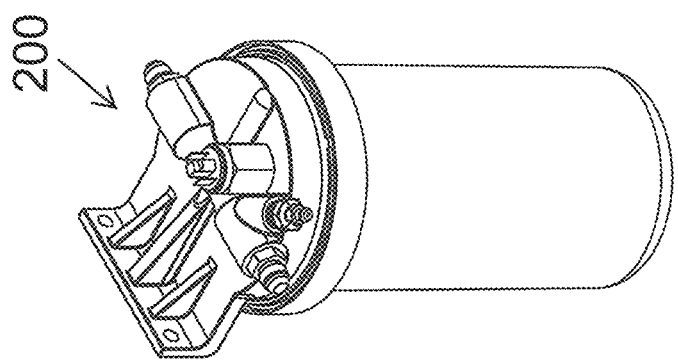
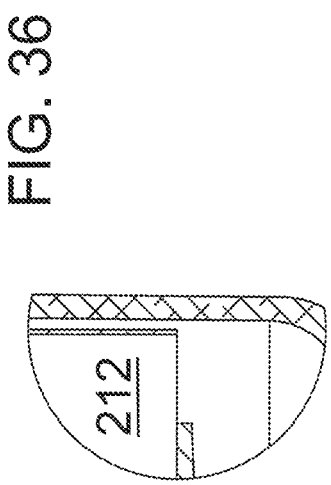
FIG. 36
FIG. 35
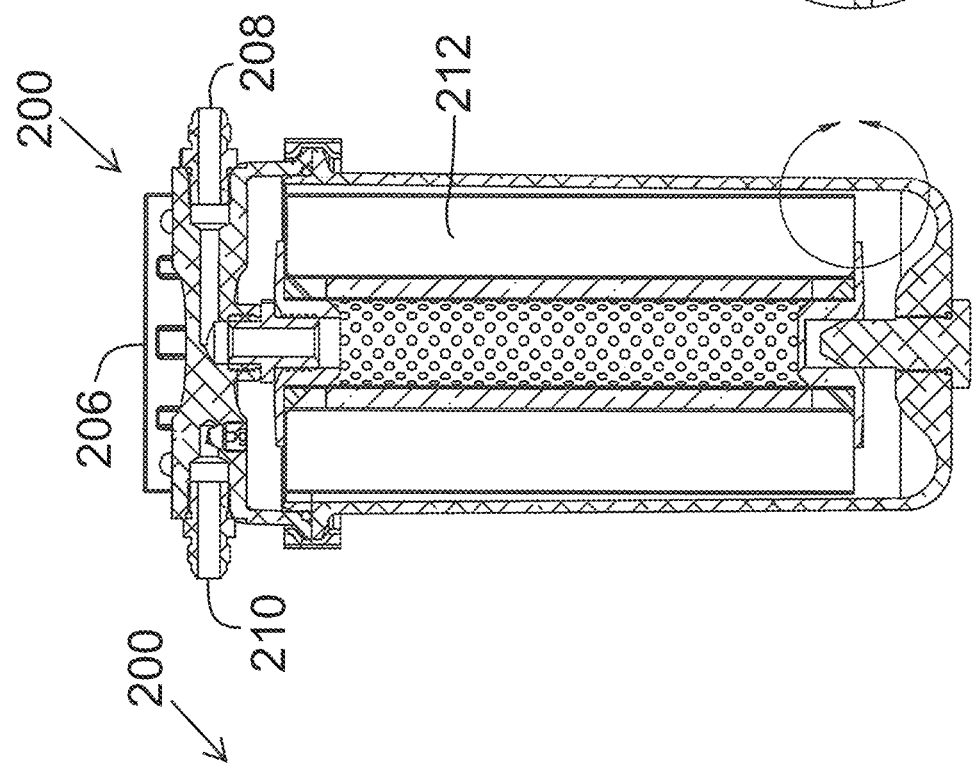
FIG. 34
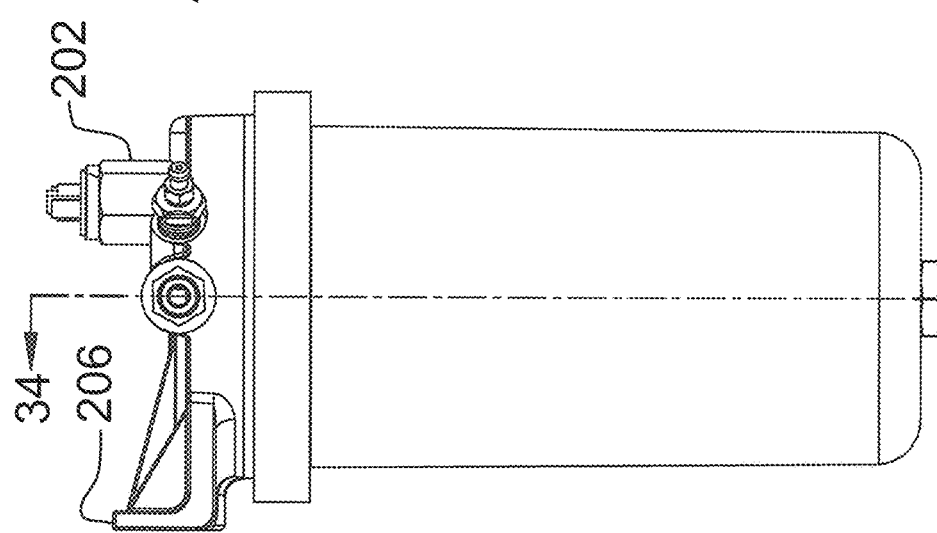
FIG. 33

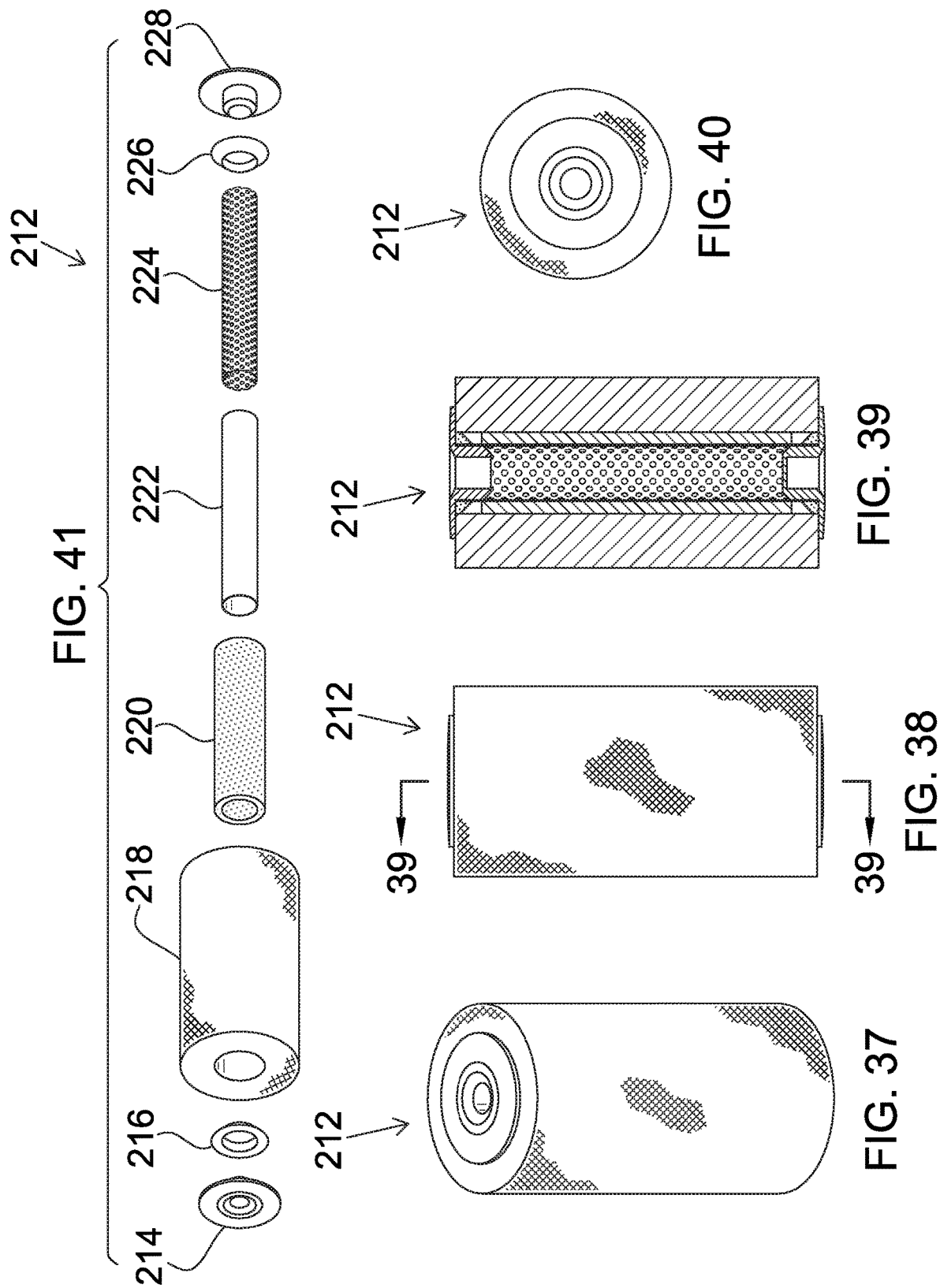

OIL CONDITIONER FOR REMOVING FLUID IMPURITIES

BACKGROUND

Contaminants in engine oil significantly degrade engine performance, shorten engine life, and increase emissions. The effect of contaminants can be especially expensive in large diesel engines, fleets of diesel vehicles, or applications utilizing hydraulic oil. Some examples include, but are not limited to, class 8 trucks, marine engines, and generator sets. Contaminants can include particulate and fluid contaminants (for example, water, glycol, diesel fuel, and the like). Water, for example, can contaminate the engine oil during oil storage and handling, such as when opening or filling containers. Water can settle on containers and be drawn in during temperature changes or can condense on the oil when the temperature drops. Glycol and water can enter the through worn engine seals or actuator seals. It has been found that 0.02% water in the oil can reduce bearing life by up to 50%, and reduce bearing life by up to 80% with just 0.05% water concentration in the oil. Conversely, if the percentage of water found in the oil is reduced to, for example, 0.0025%, bearing life can be increased by more than two times. Similarly, solid or particulate contaminants cause great harm to the bearings and other surfaces.

Thus, there is a need to reduce both solid and fluid contaminants within the engine, without major changes to the operation of the engine itself. There is a further need to provide an efficient system that draws minimal power while substantially eliminating contaminants.

SUMMARY

Aspects of the present invention teach certain benefits in construction and use which give rise to the exemplary advantages described below. The present disclosed subject matter solves the problems described above by providing, in some embodiments, an oil conditioner for removing impurities from an oil, where the oil conditioner has a housing with a conditioning chamber, an oil intake for introducing the oil into the conditioning chamber and an oil outlet for draining the oil from the conditioning chamber, and an evaporator assembly having an upper plate, a lower plate, and a heater unit sandwiched between the upper plate and the lower plate, where the upper plate has an upper plate thermal conductivity property and the lower plate has a lower plate thermal conductivity property, and where the heater unit configured to heat the upper plate when activated, where the upper plate thermal conductivity property is greater than the lower plate thermal conductivity property.

In one or more optional embodiments, the upper plate thermal conductivity property is at least 1.5 times greater than the lower plate thermal conductivity property, or the upper plate thermal conductivity property is at least 3 times greater than the lower plate thermal conductivity property, or the upper plate thermal conductivity property is at least 2 times greater than the lower plate thermal conductivity property, or the upper plate thermal conductivity property is at least 2.5 times greater than the lower plate thermal conductivity property, or the upper plate thermal conductivity property is at least 3.5 times greater than the lower plate thermal conductivity property.

In one or more optional embodiments, the upper plate is made of an aluminum material and the lower plate is made of a steel material. Optionally, the aluminum material is 6061-T6 aluminum.

In one or more optional embodiments, the oil conditioner further has a distribution chamber having a plurality of orifices positioned directly above the upper plate and configured to distribute oil from the oil intake onto the upper plate. In one or more optional embodiments, the upper plate has an evaporative surface configured to receive the oil thereon, the evaporative surface slopes downward from an inner portion to the peripheral edge.

In one or more optional embodiments, an upper surface of the lower plate is thermally reflective, the upper surface directed toward the upper plate and configured to direct thermal radiation toward the evaporator plate.

In one or more optional embodiments, the heater unit is configured as a sheet, and is in physical contact with the upper plate. Optionally, the oil conditioner further includes an oil pressure switch for activating the flow of oil when a predetermined oil pressure is sensed, a temperature regulator, and a temperature sensor in electrical communication with the temperature regulator for controlling a temperature of the upper plate. In one or more optional embodiments, a temperature of the upper plate is maintained between 1100° F. and 1400° F.

BRIEF DESCRIPTION OF THE SEVERAL VIEWS OF THE DRAWINGS

Additional objects and features if the method will be more readily apparent from the following detailed description and appended claims when taken in conjunction with the drawings, in which:

FIG. 12 is a top view of the evaporator plate;

FIG. 13 is a top perspective view of the evaporator plate;

FIG. 14 is a cross-sectional view of the evaporator plate of FIG. 12, taken along 14-14;

FIG. 15 is a magnified cross-sectional view of the evaporator plate of FIG. 14;

FIG. 16 is a top view of the heater unit;

FIG. 17 is a side view of the heater unit;

FIG. 18 is a cross-sectional view of the heater unit of FIG. 17, taken along 18-18;

FIG. 19 is a top view of the heater unit, with the heater wires attached;

FIG. 20 is a side view of the heater unit, with the heater wires attached;

FIG. 21 is a top perspective view of the heater unit, with the heater wires attached;

FIG. 33 is a side view of the particulate filter unit;

FIG. 34 is a cross-sectional view of the particulate filter unit of FIG. 33, taken along 34-34;

FIG. 35 is a magnified cross-sectional view of the particulate oil filter unit of FIG. 34;

FIG. 36 is a top perspective view of the particulate oil filter unit;

FIG. 37 is a top perspective view of the particulate oil filter unit filter or media insert;

FIG. 38 is a side view of the filter insert;

FIG. 39 is a cross-sectional view of the filter insert of FIG. 38, taken along 39-39;

FIG. 40 is a top view of the filter insert; and

FIG. 41 is an exploded side perspective view of the filter insert.

Figure 1:
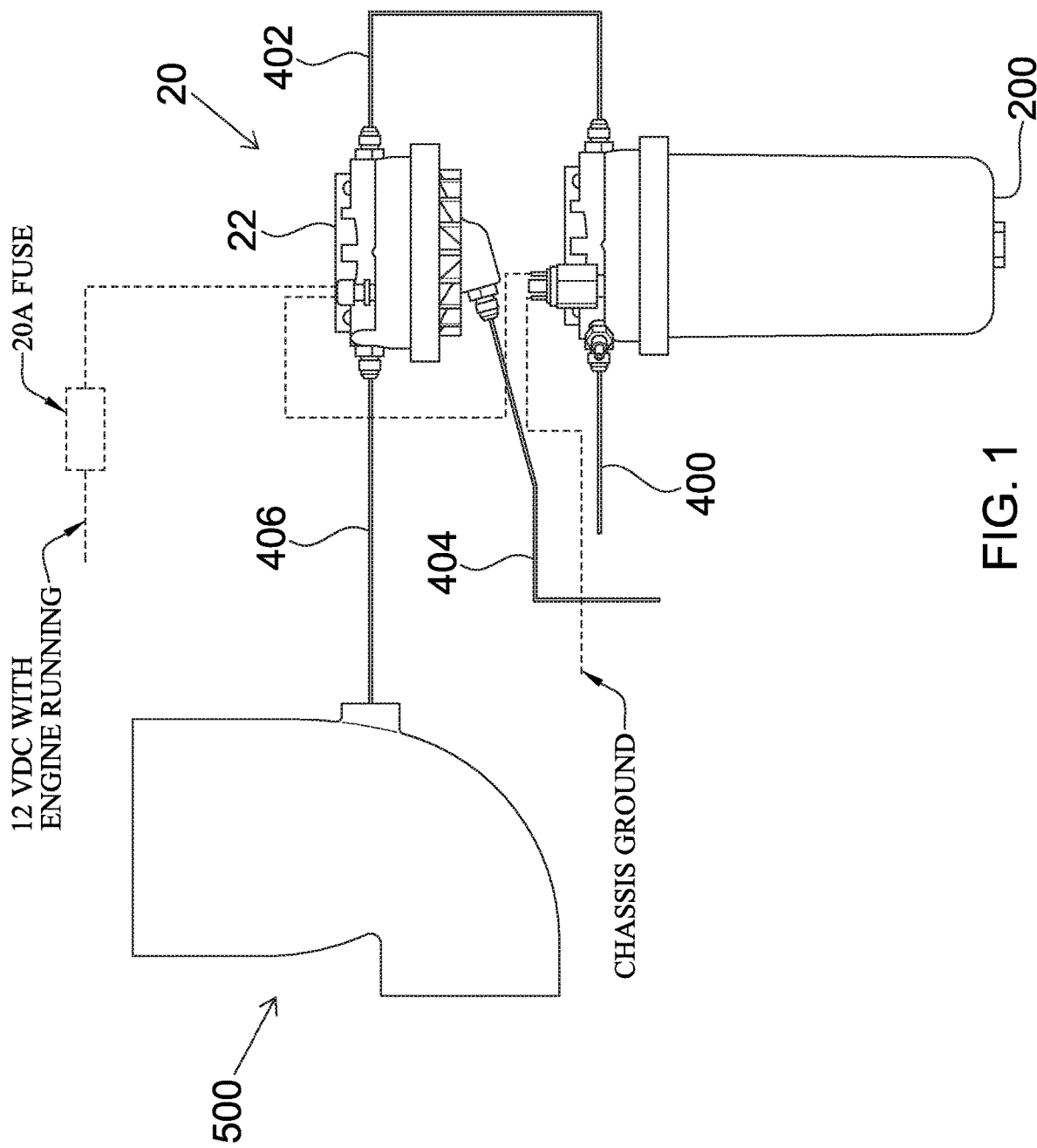
FIG. 1 is a schematic illustration of the present oil cleaning system, showing how the system is integrated in a bypass configuration to an existing engine.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

LISTING OF REFERENCE NUMERALS of FIRST-PREFERRED EMBODIMENT bypass oil cleaning system 20
oil conditioner unit 22
upper housing 24
lower housing 26
conditioning chamber 28
flange clamp 30
wire strain relief fitting 32
cooling fin 34
bracket 36
oil inlet fitting 38
oil outlet fitting 40
vapor outlet fitting 42
upper flange 44
lower flange 46
inlet conduit 48
drain 50
evaporator assembly 52
distributor 54
integral hex 55
distribution chamber 56
sealing member 58
female threaded tap 60
male thread 62
orifice 64
shoulder 65
threaded boss 66
nut 68
evaporator plate 70
heater unit 72
solder pad area 73
lower plate 74
thermistor 75
oil inlet tap 76
vapor outlet tap 78
connector board 80
thermally reflective surface 82
through hole 84, 86, 88
evaporative surface 90
underside 91
annular protrusion (lip) 92
cavity 94
floor 95
oil outlet tap 96
annular wall 97
alignment wall 98
annular wall 99
skirt (drip edge) 100
heater wires 102
leads 103
notch 104
temperature regulator 106
oil filter unit 200
oil pressure switch 202
indicator LED 204
bracket 206
oil outlet fitting 208
oil inlet fitting 210
filter element/insert 212
filter oil intake line 400
conditioner oil intake line 402
oil return line 404
vapor exhaust line 406
turbocharger intake elbow 500
vehicle chassis 502
end cap 214
adhesive 216
cotton winding 218
felt lining 220
paper lining 222
perforated steel tube 224
adhesive 226
end cap 228

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

Figure 2:
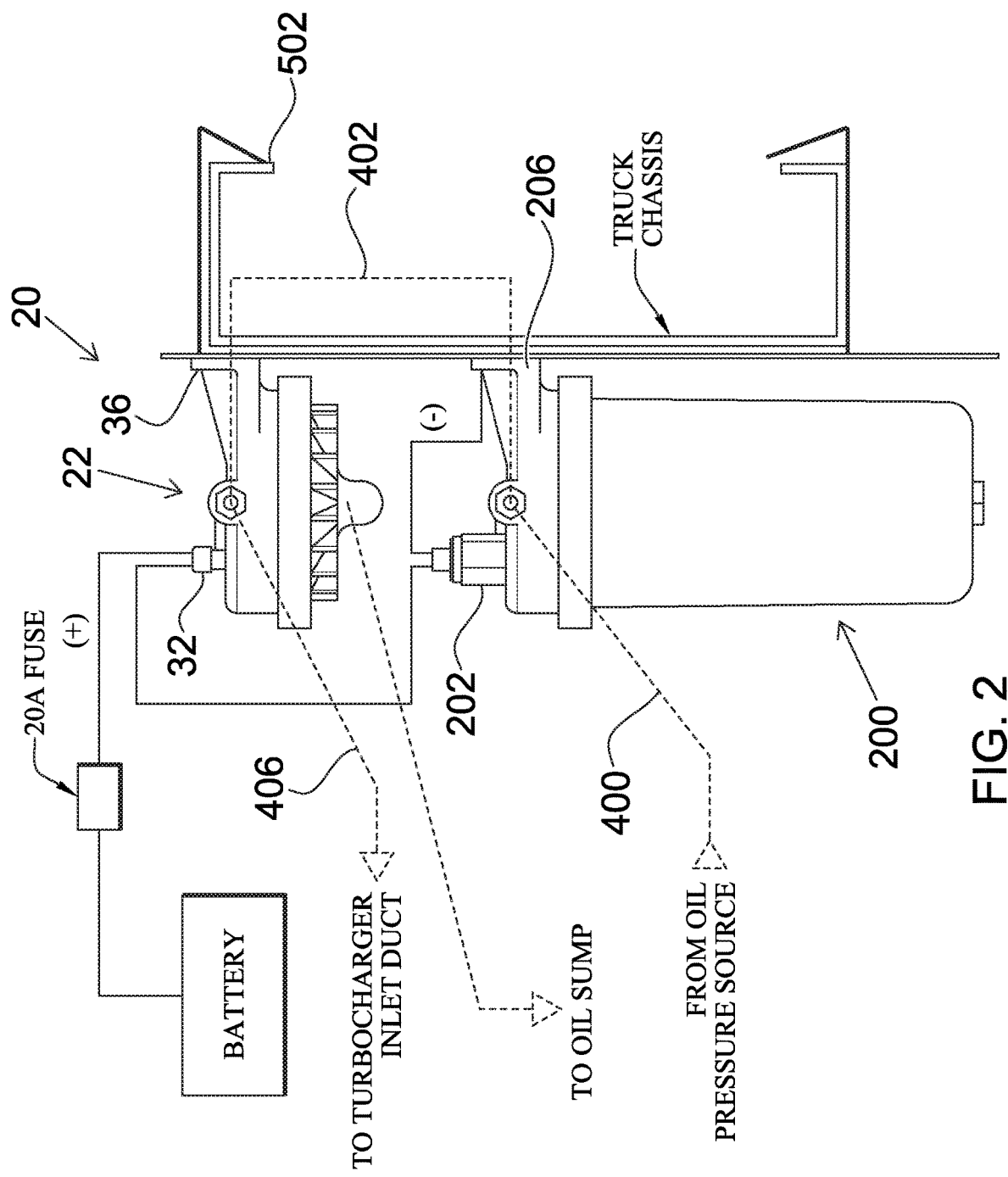
FIG. 2 is a schematic illustration of the present oil cleaning system 20 of FIG. 1, illustrating an example technique for installing the system within an engine bay.
Figure 3:
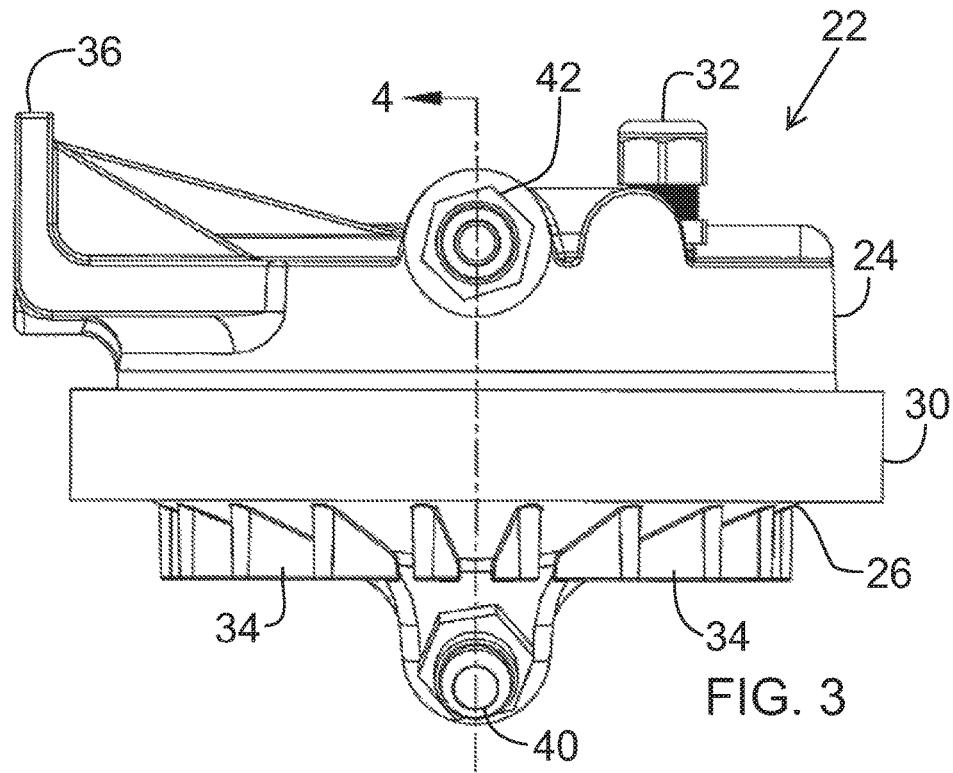
FIG. 3 is a side view of the oil conditioner unit.

An exemplary embodiment of the present oil cleaning system 20 is schematically illustrated in FIGS. 1 and 2, and generally comprises an oil conditioner unit 22 and an oil filter unit 200. The various components of the present system 20 can be mounted alongside the engine or remotely from the engine, fastened to a portion of the vehicle or structure, such as a vehicle chassis. The mounting location will vary from application to application, depending on clearance, engine layout, etc. In this example, the system 20 is mounted to the chassis of a truck through strapping, bolting, or other fastening means appropriate for the application. The oil conditioner unit 22 and an oil filter unit 200 may be bolted directly to the vehicle or to an intermediate bracket through brackets 36 and 206, respectively.

Although the oil conditioner unit 22 is shown as being integrated into a system 20 which includes the oil filter unit 200, the oil conditioner unit 22 operates separately from the oil filter unit 200 and does not require the oil filter unit 200. However, as discussed further below, the oil filter unit 200 is a preferred component of the present system 20, due to its ability to filter particles down to 1 micron in size, which protects and prolongs the life of the oil conditioner unit 22 by preventing clogging and buildup of matter within the oil conditioner unit 22. Thus, the oil conditioner may be omitted.

In this exemplary arrangement, the system 20 is arranged a bypass system, where a small portion of oil is drawn from the engine at a rate of approximately five liters per hour in parallel to the engine's oil circulation system. Oil is first drawn from the engine from an oil pressure source, such as the oil pressure sending unit tap, and delivered to the oil filter unit 200 via the filter oil intake line 400 under pressure created by the engine's oil pump. After particulate filtration, the filtered oil is delivered from the oil filter unit 200 to the oil conditioner unit 22 via the oil conditioner intake line 402. After the fluid contaminants are evaporated, the conditioned oil is delivered from the oil conditioner unit 22 back to the engine's oil circulation system to the oil sump or other oil reservoir. The contaminant vapor evaporated from the oil in the oil conditioner unit 22 is drawn from the oil conditioning unit 22 under vacuum created by the turbocharger intake side, such as the intake elbow 500, via the vapor exhaust line 406. Alternatively, a dedicated oil pump (not illustrated) may be used to draw oil from the engine; and a dedicated vacuum pump may be used to draw the contaminant vapor into an engine intake or other disposal means. An oil pressure switch 202 is in pressure communication with the oil within the oil filter unit 200 or the engine's oil circulation system to insure that the heater within the oil conditioner unit 22 remains off until sufficient pressure is sensed which would indicate that the engine is running and the alternator is producing sufficient current to safely power the heater without draining the vehicle battery.

Looking now at FIGS. 3-7 and further referencing FIGS. 8-32, the exemplary oil conditioner unit 22 (which may also be described herein as an oil conditioner) is shown in greater detail. The oil conditioner 22 is comprised of an upper housing 24 and a lower housing 26 which together define a conditioning chamber 28 internally therebetween, with an O-ring or other sealing member 58 forming a hermetic seal between the housings 24 and 26. The upper housing 24 is integrally cast with an upper annular flange 44. Likewise, the lower housing 26 is integrally cast with a lower annular flange 46. When the housings 24 and 26 are brought together with the upper and lower flanges 44 and 46 aligned, a flange clamp 30, such as a V-band, engages the upper and lower flanges 44 and 46 to securely couple the housing 24 and 26 to one another, with the O-ring 58 forming a hermetic seal. An annular alignment wall 98 protrudes above the lower flange 46 and is configured to insert into the annular wall 97 of the upper housing 24, which provides alignment and prevents substantial lateral movement between the two housings 24 and 26.

Filtered oil enters into the oil conditioner unit 22 through the oil conditioner intake line 402 coupled to the oil inlet fitting 38. The oil travels through the inlet conduit 48 to the distributor 54 threaded into the distal end of the inlet conduit 48. The oil collects in the distribution chamber 56 of the distributor 54 for immediate deposit onto the evaporator assembly 52 therebelow, through one or more orifices 64. The orifices are arranged about the threaded boss 66, preferably in a circular pattern to evenly distribute the oil on the evaporative surface. In this example, the evaporator assembly 52 comprises an evaporator plate 70 onto which the oil is deposited, a heater unit 72 is positioned below the evaporator plate 70 for heating the evaporator plate 70, and a lower plate 74 is positioned below the heater unit 72 for providing thermal insulation and for reflecting heat toward the evaporator plate 70, so that a majority of heat produced by the heater unit 72 is transferred to the evaporator plate 70 and to insure a more even temperature distribution about the evaporator plate 70.

In the illustrated embodiment, the heater unit 72 is a thin flexible heater shaped like a sheet, such as a silicone rubber heating element, which distributes heat to a substantial majority, if not all, of the evaporative surface 90 (the top surface of the evaporator plate 70 that comes into direct contact with the oil dispersed from the distributor 54, for example, more than 75% of the area of the evaporative surface 90, more than 85% of the area of the evaporative surface 90, more than 90% of the area of the evaporative surface 90, more than 95% of the area of the evaporative surface 90, or even 100% of the area of the evaporative surface 90. The heater unit 72 preferably is similarly shaped as the evaporative surface 90, in this case, both are circular.

Figure 4:
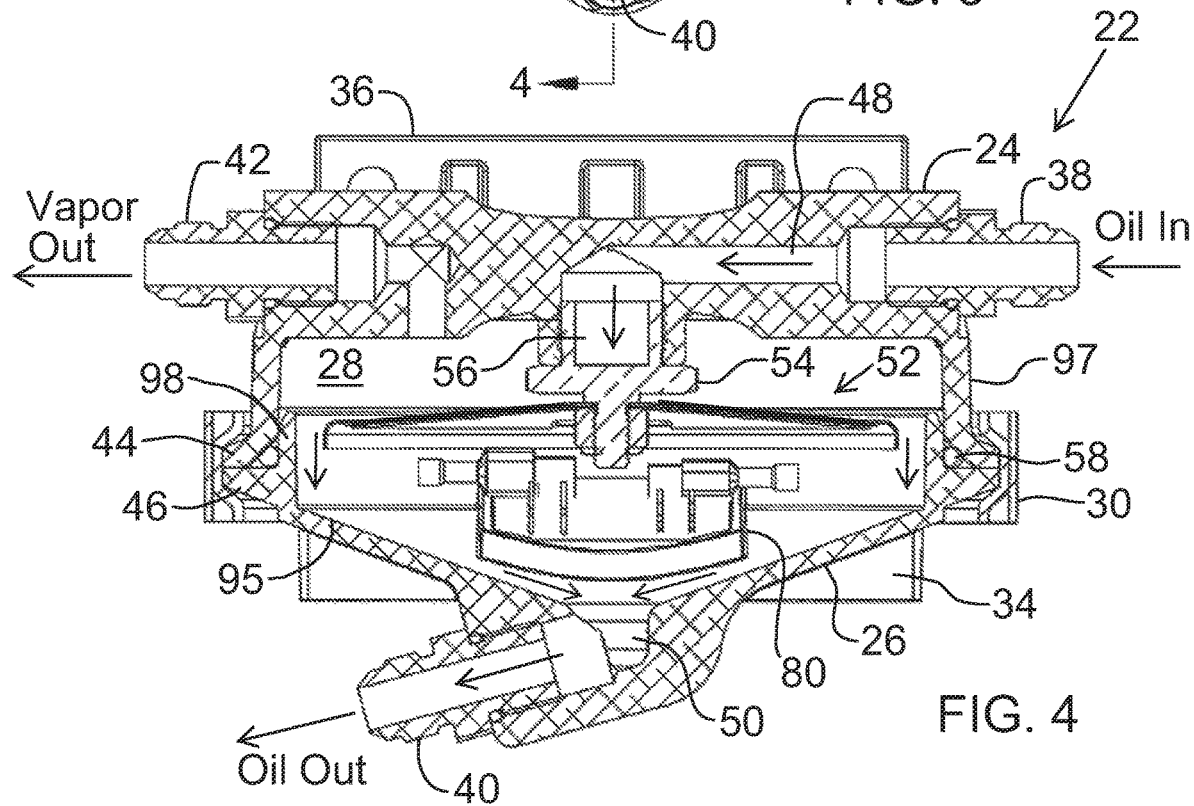
FIG. 4 is a cross-sectional view of the oil conditioner unit of FIG. 3, taken along 4-4.
Figure 5:
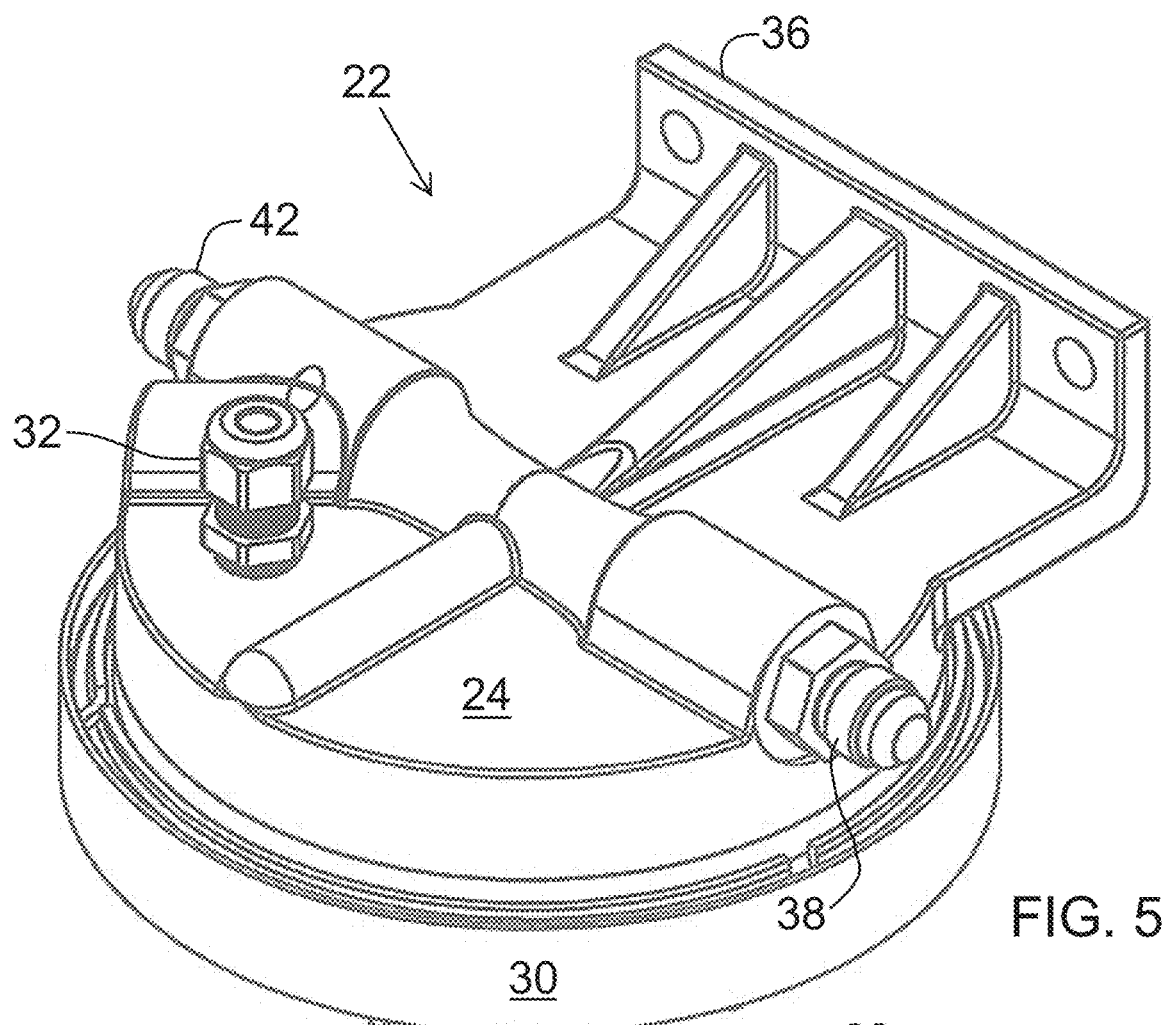
FIG. 5 is a top perspective view of the oil conditioner unit of FIG. 3.
Figure 6:
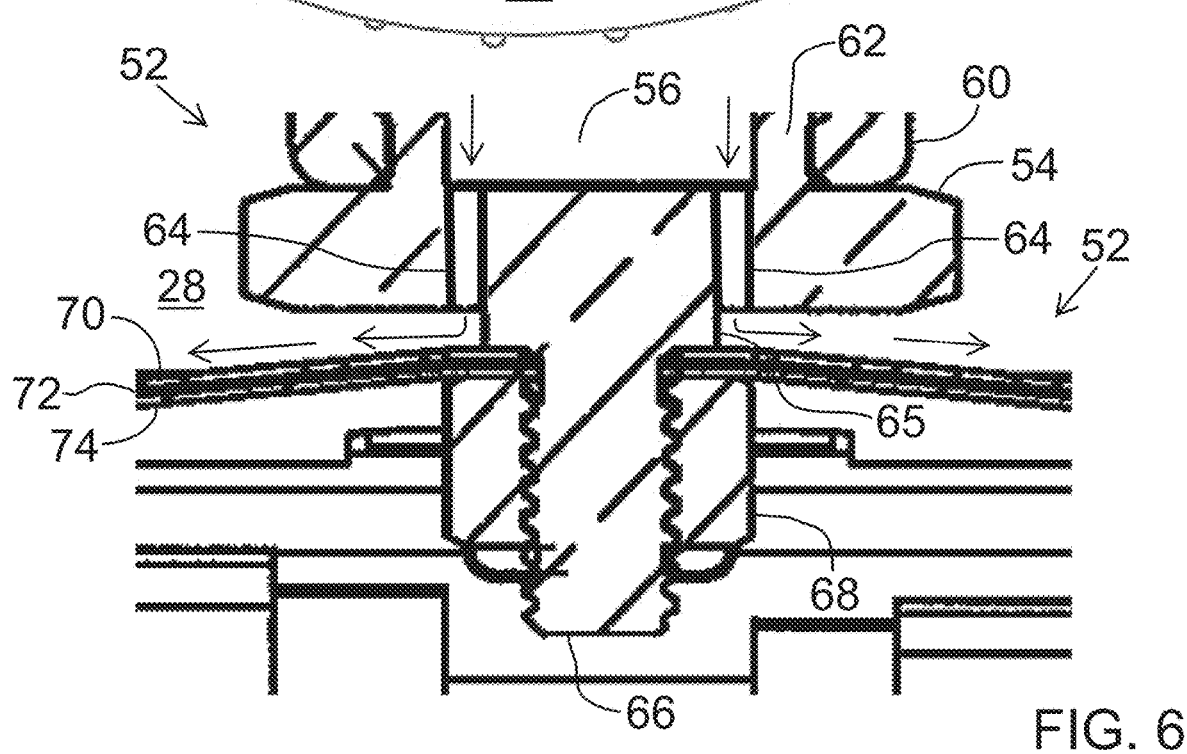
FIG. 6 is a magnified of the cross-section of FIG. 4, showing the layers of the heating assembly.
Figure 7:
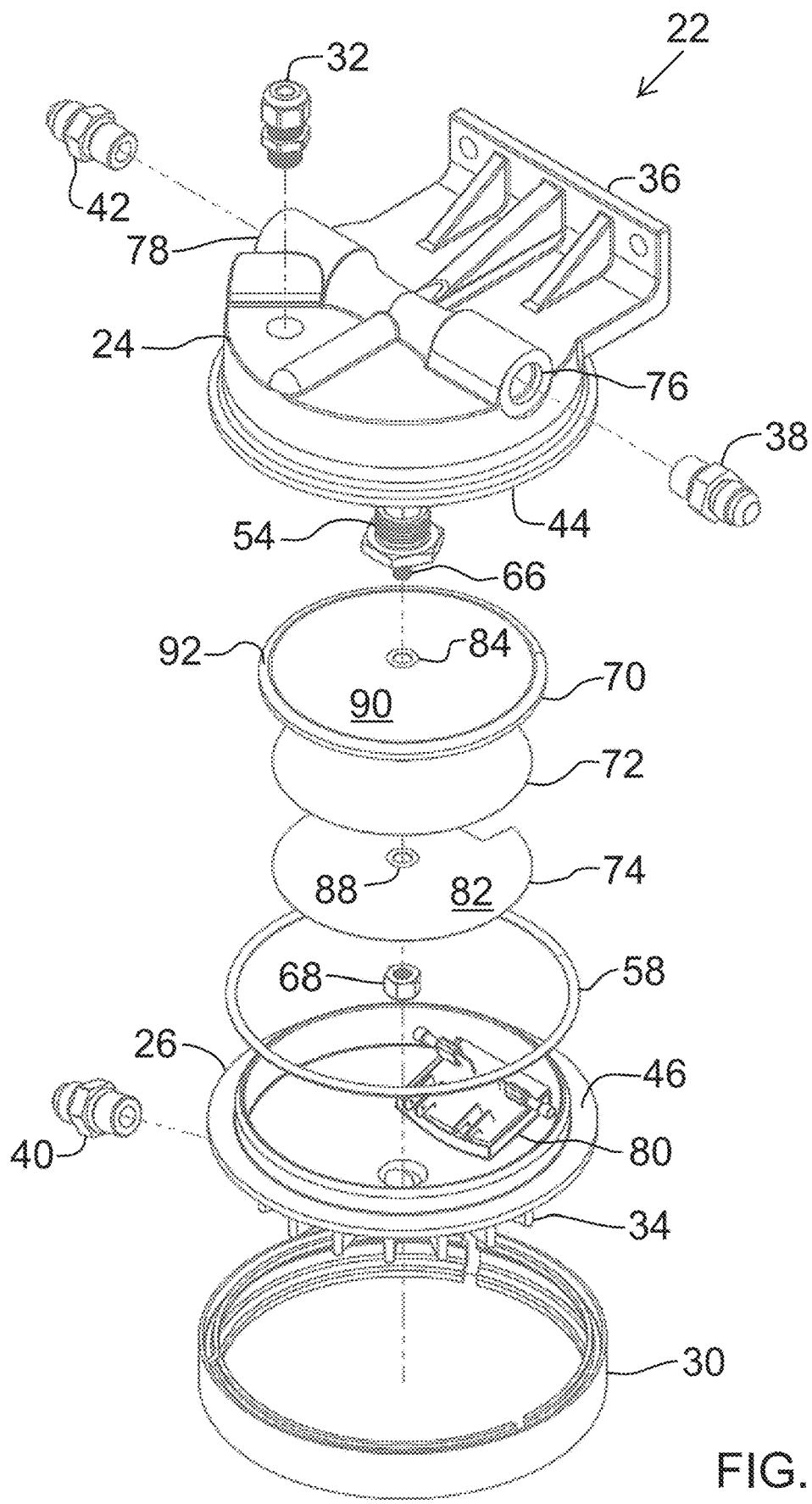
FIG. 7 is an exploded top perspective view of the oil conditioner unit of FIG. 3.
Figure 8:
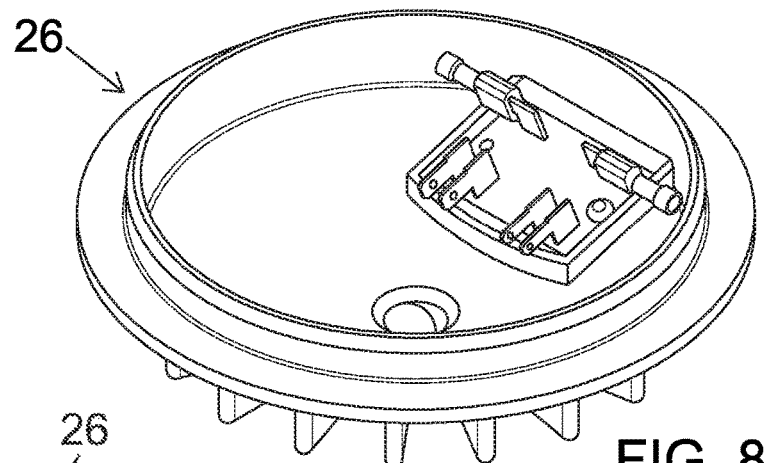
FIG. 8 is a top perspective view of the lower housing of the oil conditioner unit.
Figure 9:
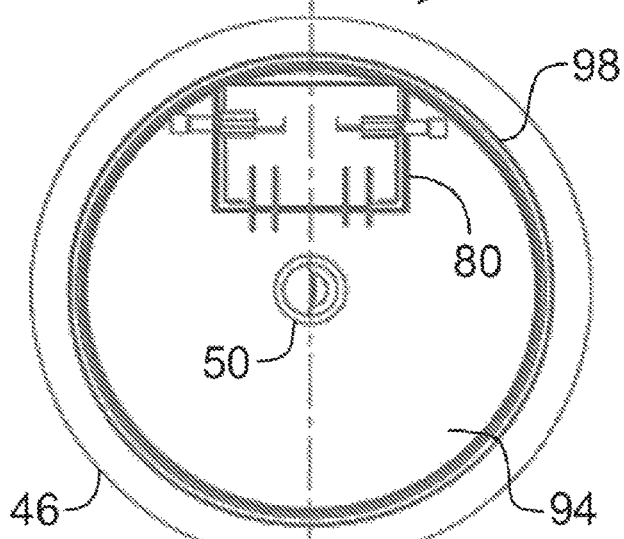
FIG. 9 is a top view of the lower housing of the oil conditioner unit.
Figure 10:
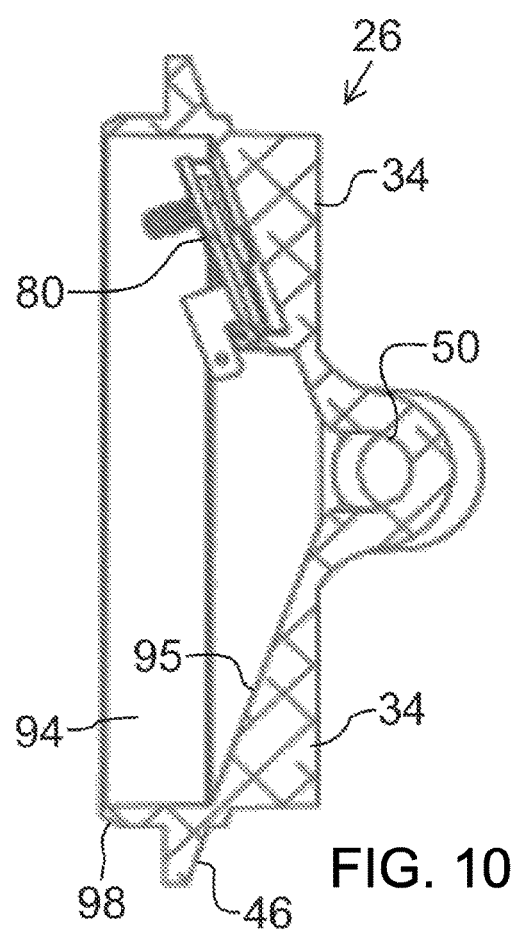
FIG. 10 is a cross-sectional view of the lower housing of FIG. 9, taken along 10-10.
Figure 11:
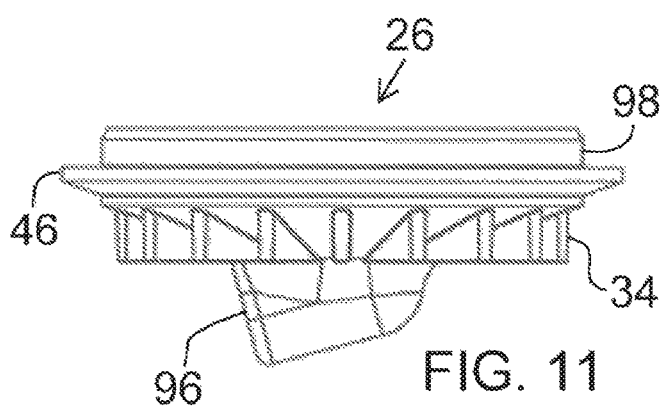
FIG. 11 is a side view of the lower housing of the oil conditioner unit.

Looking at FIGS. 4 and 6, the heating element 72 is preferably sandwiched between the evaporator plate 70 and the lower plate (which may also be called a heat reflecting plate or member). The distributor 54 includes a threaded boss 66 extending centrally downward. Each of the evaporator plate 70, heater unit 72, and lower plate 74 have a central through hole 84, 86, and 88, respectively, for receiving therethrough the evaporator plate 70, heater unit 72, and lower plate 74 closely stacked atop one another in a nested relationship. Nut 68 is threaded onto the threaded boss 66, capturing the evaporator plate 70, heater unit 72, and lower plate 74 on the threaded boss 66. As the nut 68 is tightened, it forces the heater unit 72 into contact with the underside of the evaporator plate 70, where the lower plate 74 is pushed up by the nut 68, and the lower plate 74 provides broad support beneath the heater unit 72, such that the entire surface of the heater unit 72 is pushed into contact with the evaporator plate 70. The thusly stacked or nested evaporator assembly 52 is firmly held between the nut 68 and annular shoulder 65 formed at the root of the threaded boss 66 proximal to the body of the distributor 54. The height of the shoulder 65 creates a gap between the evaporative surface 90 of the evaporator plate 70 and the outlets of the orifices 64, so that the oil can freely drain onto the evaporative surface 90. In this example embodiment, the heater element 70 is a thin flexible sheet, which is configured to conform to the underside 91 of the evaporator plate 70. The lower plate 74 may be stiff, or substantially still (e.g., deforming less than 10% from any original dimension when under the torque provided by nut 68), or may be sufficiently flexible to deform from a flat plate to a conical or frustoconical shape when under the torque provided by nut 68.

Continuing the description of the oil's flow through the oil conditioner unit 22, the oil is deposited upon the evaporative surface 90 of the evaporator plate 70, where the oil will sheet and flow down the conical or frustoconical shaped evaporative surface 90 and flow over the outermost edge of the evaporator plate 70. The oil drips onto the floor 95 of the cavity 95 formed in the lower housing 26. The floor 95 is sloped toward a drain 50, which permits the conditioned oil to exit the oil conditioner unit 22 through the oil outlet fitting 40, being carried back to the oil sump or reservoir through the oil return line 404. Cooling fins 34 protrude in a radial pattern (or other pattern) from the lower housing 26 opposite the floor 95, which cools the oil at least partially before being reintroduced back into the oil sump.

Figure 29:
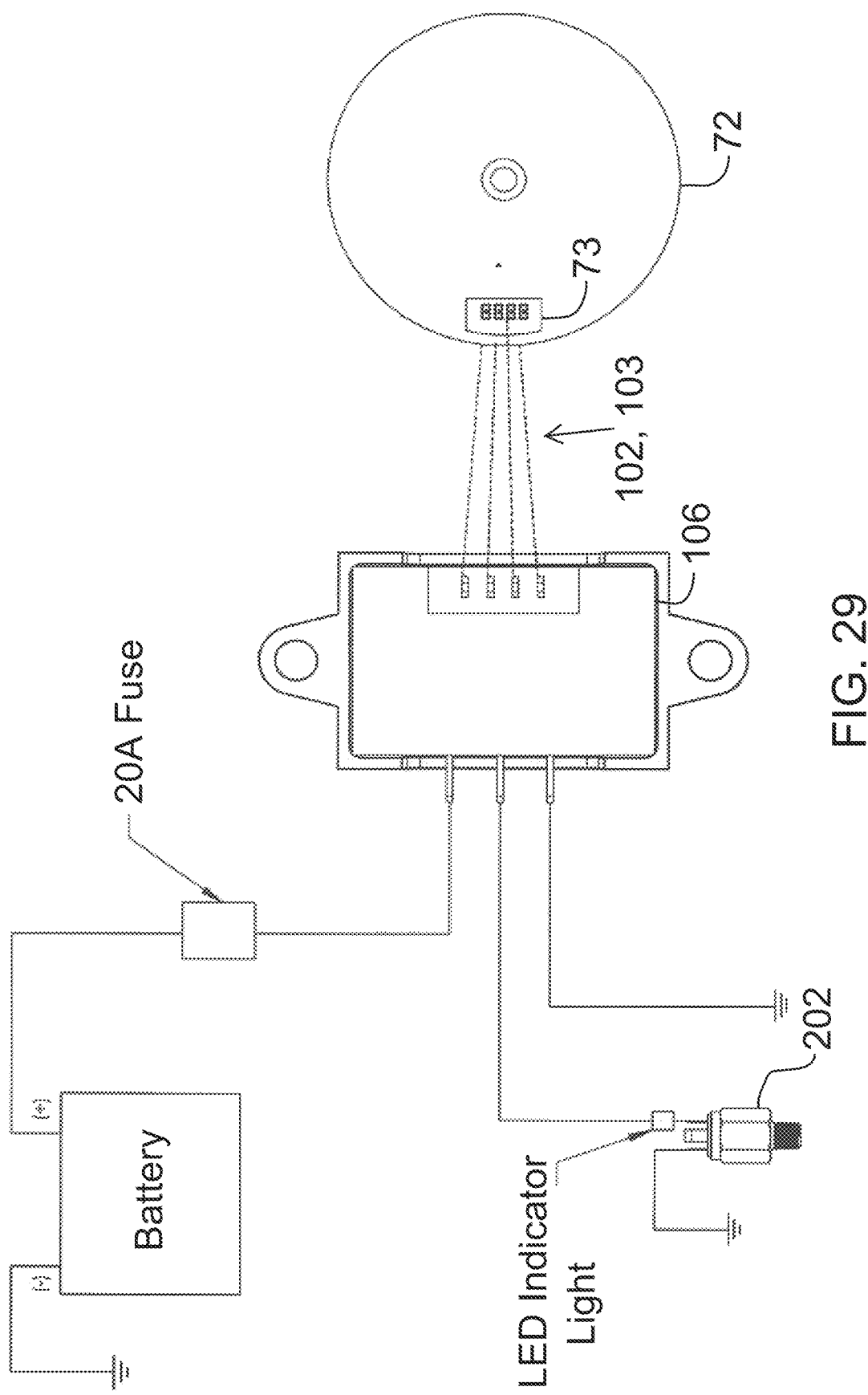
FIG. 29 is a schematic illustration of the electro-mechanical system for powering and controlling the heater unit.
Figure 30:
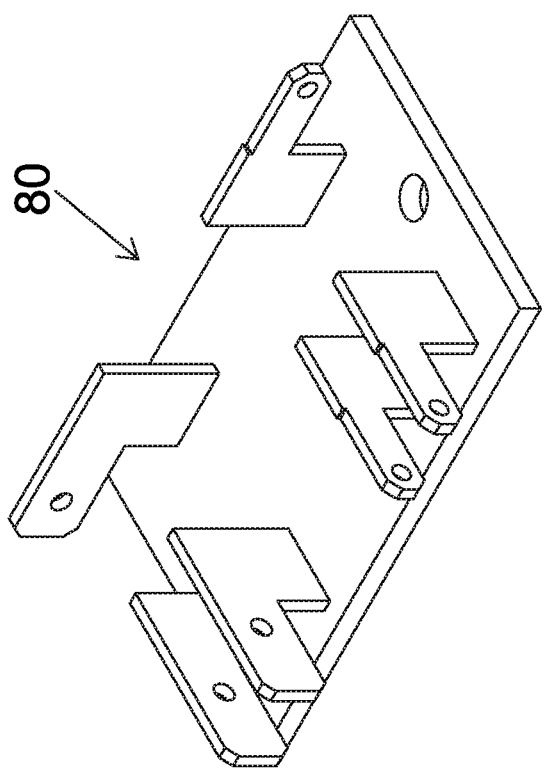
FIG. 30 is a top perspective view of the heater wire connector board.
Figure 31:
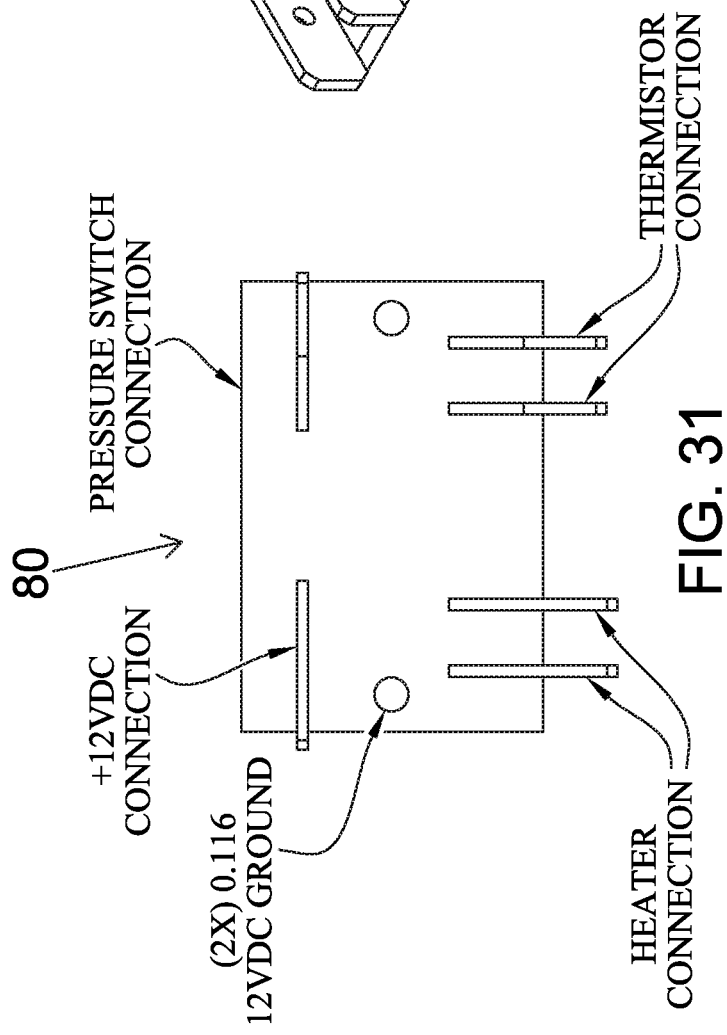
FIG. 31 is a top view of the heater wire connector board.
Figure 32:
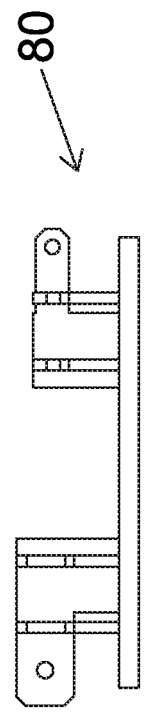
FIG. 32 is a side view of the heater wire connector board.

A temperature regulator 106, as schematically illustrated in FIG. 29, turns the heater unit on and off, on if the oil pressure switch 202 sends a signal to the temperature regulator 106 indicating that sufficient oil pressure is detected which indicates the engine is at least on or sufficiently warmed up. A thermistor 75 on the heater unit 72 communicates the temperature sensed at the heater unit 72 to the temperature regulator 106. The temperature regulator 106 can have one or more temperature set points, where the temperature set point is a temperature configured to be high enough to evaporate at least one undesired contaminant (e.g., one or more of water, glycol, fuel, etc.), but below the temperature which could damage or burn the oil. In some example embodiments, the temperature set point is between 1100° F. and 1400° F., or between 1150° F. and 1250° F., or between 1150° F. and 1300° F., or between 1200° F. and 1300° F. In some preferred embodiments, the temperature set point is 1200° F.

Further, the temperature set point may be set high enough to evaporate all of the expected contaminants, but not too high as to draw an excessive current. A fuse is preferably disposed operatively between the vehicle battery or other power source and the temperature regulator 106 to prevent excessive current draw, for example, a 20 A fuse. Preferably, the heater unit 72 is capable of dissipating 135 W at 12 VDC. Heater wires 102 connect the temperature regulator 106 with the connector board 80 within the conditioner chamber 28 with the heater wires 102 inserted through the wire strain relief fitting 32.

FIGS. 16-21 illustrate various components of the heater unit 72, including the solder pad area 73 and the thermistor 75 on the heater unit 72, as well as the four leads 103 soldered to the solder pad 73 and connecting the heater unit 72 to the connector board 80. The leads 103 plug into the connector board 80; and the heater wires 102 are soldered to the connector board 80, effectively connecting the heater unit 72 to the temperature regulator 106. Control and power signals received from temperature regulator 106 are communicated to and/or from both the oil conditioner unit 22 and the filter unit 200. The temperature regulator 106 implements a PWM circuit for modulating the heater unit 72 output around a set temperature value.

Looking more closely at FIGS. 12-14, the evaporator plate 70 is preferably made of 6061-T6 aluminum stamped into a 0.016 inch thick plate, with an annular skirt 100 formed about the periphery. The annular skirt 100 acts as a drip edge to prevent the oil from clinging to the evaporator plate 70 and coating the heater element 72 and the lower plate 74. An annular protrusion or lip 92, and annular hump protruding between about 0.01 and 0.02 inches above the evaporative surface 90, and is formed in the stamping process. The evaporative surface 90 slopes downwards from the center to the peripheral edge at an angle of approximately $\theta=5°$, although the evaporative surface 90 may also be planar in another embodiment, or vary between 1° and 10°. The angle can be, in part, optimized so that the oil resides on the evaporative surface 90 for a sufficient time to insure most, if not all, the fluid contaminants are evaporated. The annular protrusion 92 acts as a dam to hold a thin layer of oil atop the evaporative surface 90 to increase the oil residence time on the evaporative surface 90 and so that the thin layer of oil quickly heats the oil dripping from the distributor 54. Further the thin layer of oil prevents the evaporative surface 90 from drying and overheating, where portions of the oil may burn, before the temperature regulator 106 can adjust the power output accordingly. Although specific measurements and outputs are described herein, these are merely exemplary, and many factors are considered as a whole in a specific design, such as incoming oil temperature, the slope of the evaporative surface 90, the maximum power output of the heater unit 72, the oil flow rate out of the distributor 54, and the height of the annular protrusion 92. If one design factor is adjusted, others may be adjusted to compensate for the change. Preferably the heater unit 72 power output range is sufficiently wide to cover variations in incoming oil temperature or other operational factors.

Figure 24:
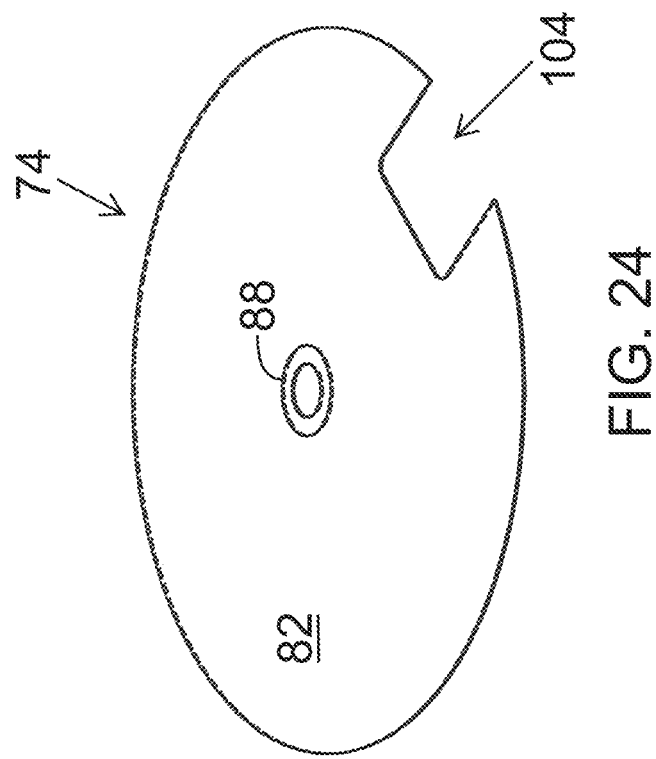
FIG. 24 is a top perspective view of the lower plate.
Figure 23:
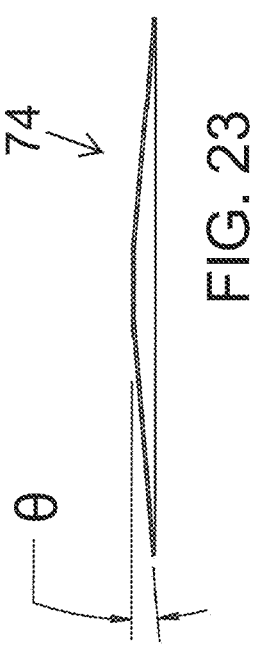
FIG. 23 is a side view of the lower plate.
Figure 22:
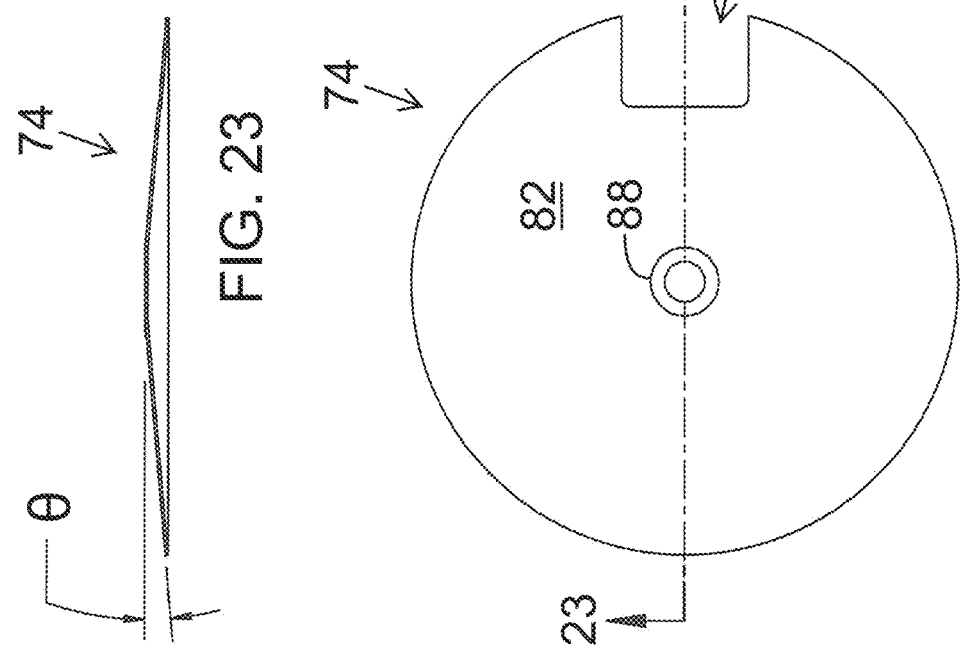
FIG. 22 is a top view of the lower plate.
Figure 25:
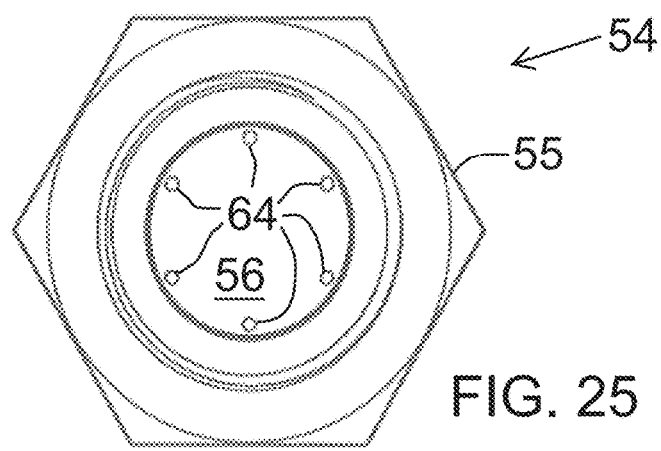
FIG. 25 is a top view of the distributor.
Figure 26:
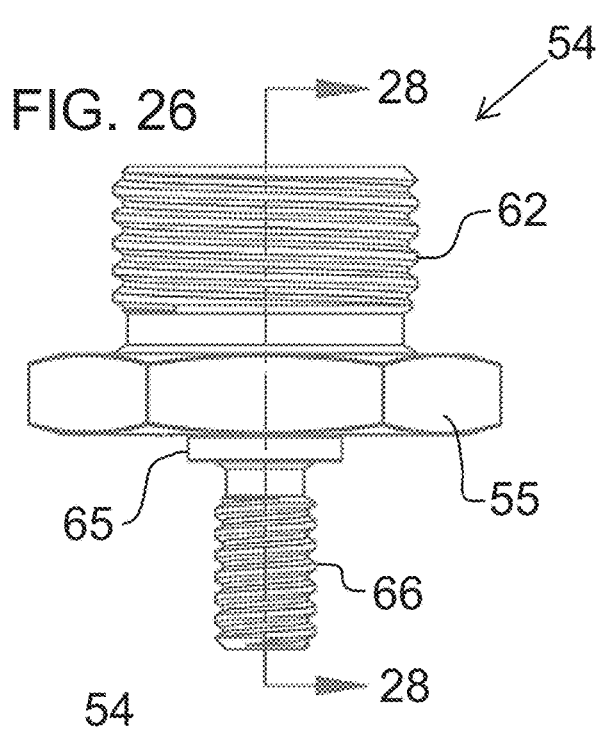
FIG. 26 is a side view of the distributor.
Figure 28:
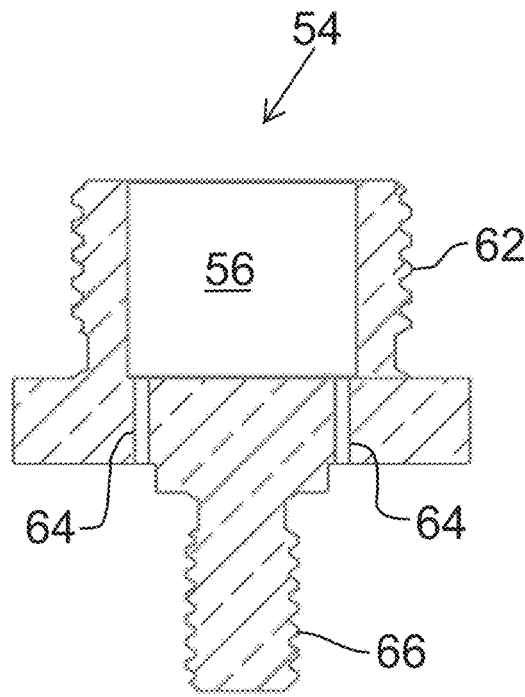
FIG. 28 is a cross-sectional view of the distributor of FIG. 17, taken along 28-28.
Figure 27:
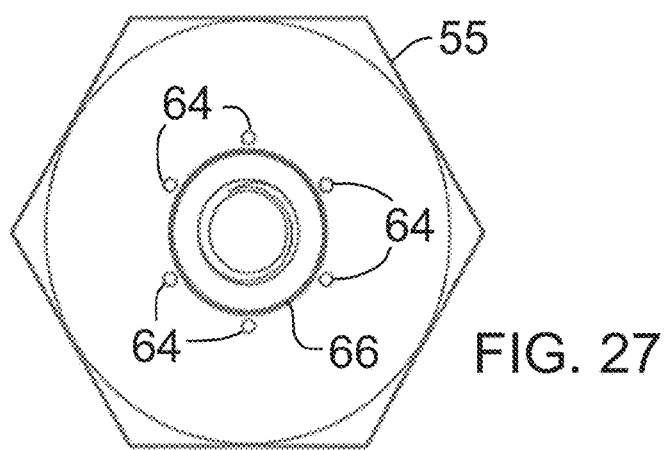
FIG. 27 is a bottom view of the distributor.

The lower plate 74, as illustrated in FIGS. 22-24, is preferably made of plain steel stamped into a 0.016 inch thick plate angled similarly (at 5°) as the evaporator plate 70, and having a notch 104 cut out form the edge to provide clearance for power and control wires to the heater unit 72.

Although the materials for the lower plate 74 and the evaporator plate 70 are designated herein, these are merely exemplary materials, which may be changed according to the application and according to the unique and synergistic arrangement created when layering in a compressed or firmly sandwiched assembly the evaporator plate 70 and the thin sheet heater unit 72 fully contacting the underside 91 of the evaporator plate 70 pushed into conforming contact by the lower plate 74. Here, a synergistic effect is produced due to the difference in thermal conductivity between the lower plate 74 and the evaporator plate 70 and due to the thermally reflective surface 82 on the upper surface of the lower plate 74, where the thermally reflective surface 82 is directed toward the heater unit 72 and the evaporator plate 70, for directing thermal radiation to the evaporator plate 70. In the present example, 6061-T6 aluminum has a thermal conductivity value of approximately 167 W/m–K, and steel is approximately 50 W/m–K. Thus, the thermal conductivity of the evaporator plate 70 is more than three times the thermal conductivity of the lower plate 74, although this ratio may vary depending on the temperature. For example, the evaporator plate 70 may be between 1.5 to 2 times the thermal conductivity of the lower plate 74; the evaporator plate 70 may be between 2 to 2.5 times the thermal conductivity of the lower plate 74; the evaporator plate 70 may be between 2-3 times the thermal conductivity of the lower plate 74; the evaporator plate 70 may be between 2.5-3.5 times the thermal conductivity of the lower plate 74; and the evaporator plate 70 may be greater than 3.5 times the thermal conductivity of the lower plate 74.

Due to the unique arrangement of the present evaporator assembly 52, heat is directed to the evaporator plate 70, requiring less power to operate at a desired temperature. The lower plate 74 acts somewhat as a thermal insulator when compared to the evaporator plate 70. Further, because steel transfers heat at a much lower rate compared to aluminum, the lower plate 74 acts as a thermal reservoir maintaining temperature and radiating heat toward the evaporator plate 70. Thus, it is easier to maintain an ideal temperature range without excessive power consumption, with improve results.

The oil filter unit 200 is known in the art, and will thus be described briefly herein, in reference to FIGS. 33-41. The oil is delivered to the inlet fitting 210 from the engine, forced through the filter element 212, and flows to the outlet fitting 208, which provides filtered oil to the oil conditioner unit 22. FIG. 41 illustrates an example oil filter unit 200 compatible with the oil conditioner unit 22, and includes an end cap 214, adhesive 216, cotton winding 218, felt lining 220, paper lining 222, a perforated steel tube 224, adhesive 226, and an end cap 228, which are held together within the oil filter unit 200.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular article, apparatus, methodology, and/or protocol, described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of" As such embodiments described herein or so claimed with the phrase "comprising" are expressly or inherently unambiguously described, enabled and supported herein for the phrases "consisting essentially of" and "consisting of"

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

What is claimed is:

1. An oil conditioner for removing impurities from an oil, the oil conditioner comprising:
a conditioning chamber having an oil intake for introducing the oil into the conditioning chamber and an oil outlet for draining the oil from the conditioning chamber; and
an evaporator assembly having an upper plate, a lower plate, and a heater unit sandwiched between the upper plate and the lower plate, the upper plate having an upper plate thermal conductivity property and the lower plate having a lower plate thermal conductivity property, the heater unit configured to heat the upper plate when activated;
an oil pressure switch for activating flow of the oil when a predetermined oil pressure is sensed; and
a temperature sensor in electrical communication with a temperature regulator for controlling a temperature of the upper plate;
wherein the upper plate thermal conductivity property is greater than the lower plate thermal conductivity property.

2. The oil conditioner of claim 1 wherein the upper plate thermal conductivity property is at least 1.5 times greater than the lower plate thermal conductivity property.

3. The oil conditioner of claim 1 wherein the upper plate thermal conductivity property is at least 3 times greater than the lower plate thermal conductivity property.

4. The oil conditioner of claim 1 wherein the upper plate thermal conductivity property is one of at least 2 times greater than the lower plate thermal conductivity property, at least 2.5 times greater than the lower plate thermal conductivity property, and at least 3.5 times greater than the lower plate thermal conductivity property.

5. The oil conditioner of claim 1 wherein the upper plate is made of an aluminum material and the lower plate is made of a steel material.

6. The oil conditioner of claim 5 wherein the aluminum material is 6061-T6 aluminum.

7. The oil conditioner of claim 1 further comprising a distribution chamber having a plurality of orifices positioned directly above the upper plate and configured to distribute the oil from the oil intake onto the upper plate.

8. The oil conditioner of claim 1 wherein the upper plate has an evaporative surface configured to receive the oil thereon, the evaporative surface slopes downward from an inner portion to the peripheral edge.

9. The oil conditioner of claim 1 wherein an upper surface of the lower plate is thermally reflective, the upper surface directed toward the upper plate and configured to direct thermal radiation toward the evaporator plate.

10. The oil conditioner of claim 1 wherein the heater unit s configured as a sheet, and is in physical contact with the upper plate.

11. The oil conditioner of claim 1 wherein a temperature of the upper plate is maintained between 1100° F. and 1400° F.

12. An oil conditioner for removing impurities from an oil, the oil conditioner comprising:
a housing having a conditioning chamber, an oil intake for introducing the oil into the conditioning chamber and an oil outlet for draining the oil from the conditioning chamber; and
an evaporator assembly having an upper plate, a lower plate, and a heater unit sandwiched between the upper plate and the lower plate, the upper plate having an upper plate thermal conductivity property and the lower plate having a lower plate thermal conductivity property, the heater unit configured to heat the upper plate when activated; and
a temperature sensor in electrical communication with a temperature regulator for controlling a temperature of the upper plate;
wherein the upper plate thermal conductivity property is greater than the lower plate thermal conductivity property;
and wherein the lower plate has an upper surface that is thermally reflective, the upper surface directed toward the upper plate and configured to direct thermal radiation toward the upper plate.

13. The oil conditioner of claim 12 wherein the upper plate thermal conductivity property is at least 1.5 times greater than the lower plate thermal conductivity property.

14. The oil conditioner of claim 12 wherein the upper plate thermal conductivity property is at least 3 times greater than the lower plate thermal conductivity property.

15. The oil conditioner of claim 12 wherein the upper plate thermal conductivity property is one of at least 2 times greater than the lower plate thermal conductivity property, at least 2.5 times greater than the lower plate thermal conductivity property, and at least 15 times greater than the lower plate thermal conductivity property.

16. The oil conditioner of claim 12 wherein the heater unit is configured as a flexible sheet, and is in physical contact with the upper plate.

17. The oil conditioner of claim 12 wherein a temperature of the upper plate is maintained between 1100 and 1400° F.

18. An oil conditioner for removing contaminates from an oil of an engine having a turbocharger with an intake side, the oil conditioner comprising: a conditioning chamber having an oil intake for introducing the oil into the conditioning chamber and an oil outlet for draining the oil from the conditioning chamber; an evaporator assembly having an upper plate, a lower plate, and a heater unit sandwiched between the upper plate and the lower plate, the upper plate having an upper plate thermal conductivity property and the lower plate having a lower plate thermal conductivity property lesser than the upper plate thermal conductivity property, the heater unit configured to heat the upper plate when activated to evaporate at least some of the contaminates; an oil pressure switch for activating flow of the oil when a predetermined oil pressure is sensed; and a temperature sensor in electrical communication with a temperature regulator for controlling a temperature of the upper plate; wherein the upper plate thermal conductivity property is greater than the lower plate thermal conductivity property; and a vapor exhaust line configured to convey evaporated contaminates from the conditioning chamber to the intake side of the turbocharger, drawn under vacuum of the turbocharger.

19. The oil conditioner of claim 18 wherein the upper plate thermal conductivity property is at least 1.5 times greater than the lower plate thermal conductivity property or is at least 3 times greater than the lower plate thermal conductivity property.

* * * * *